G. ESTERLY.
Harvester.
No. 31,159.
Patented Jan'y 22, 1861
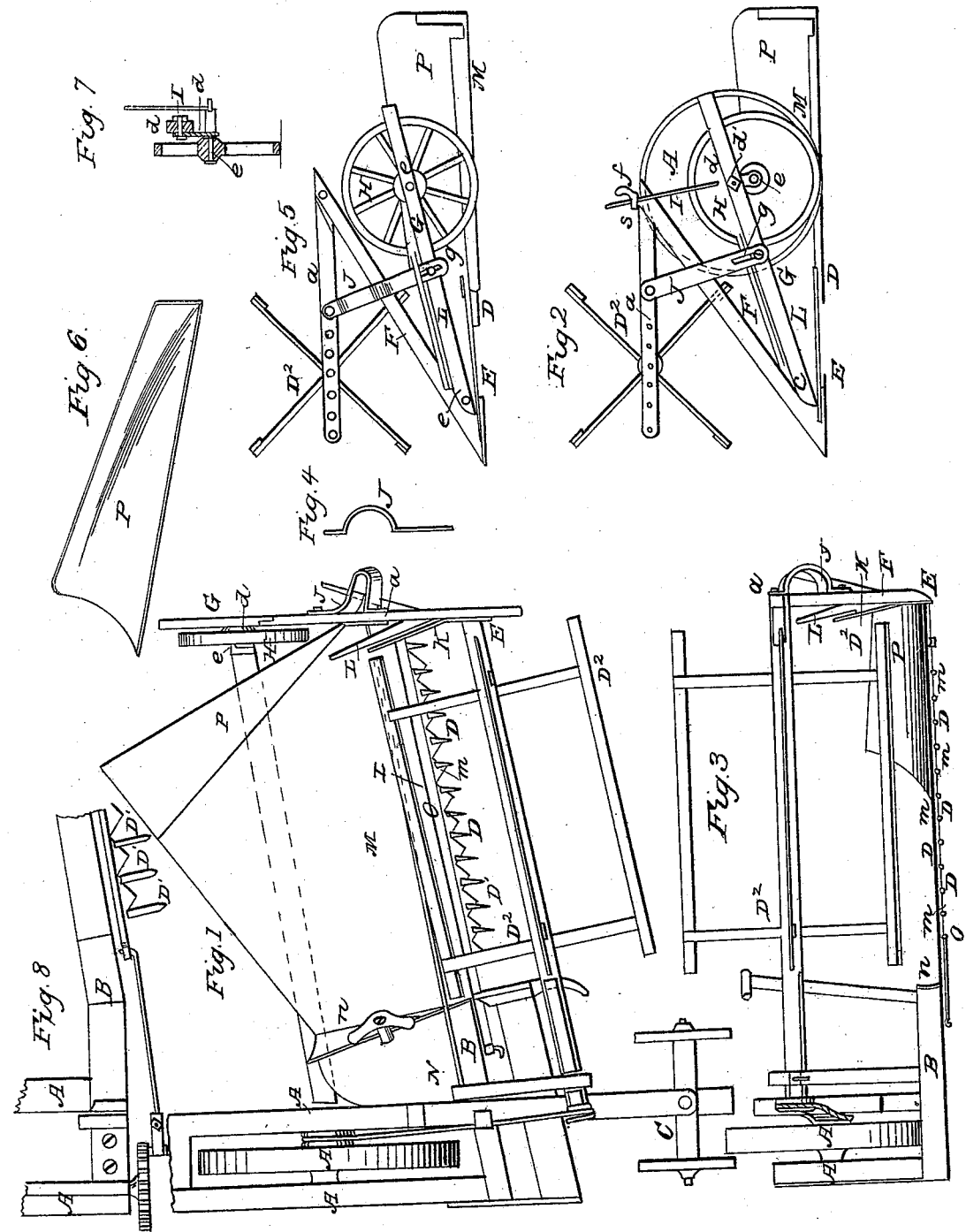
WITNESSES
INVENTOR

UNITED STATES PATENT OFFICE.

GEORGE ESTERLY, OF WHITE WATER, WISCONSIN.

IMPROVEMENT IN HARVESTERS.

Specification forming part of Letters Patent No. 31,159, dated January 22, 1861.

*To all whom it may concern:*

Be it known that I, GEORGE ESTERLY, of White Water, in the county of Walworth and State of Wisconsin, have invented a new and useful Improvement in the Combined Harvester and Mower; and I do hereby declare that the following is a full, clear, and exact description of the same, reference being had to the accompanying drawings, forming a part of this specification, in which—

Figure 1 is a plan of my improved combined harvester and mower; Fig. 2, an elevation of the grain side of the machine; Fig. 3, a front view; Fig. 4, an edge view of the standard for supporting the reel; Fig. 5, an elevation of the grain side of the harvester. This view is merely drawn for the purpose of facilitating the description hereinafter to be given. Figs. 6 and 7 are detached views; and Fig. 8 is a modification of the front sill, A'.

Similar letters of reference in each of the several figures indicate corresponding parts.

The nature of my invention consists, first, in the combination and arrangement, with the reel and cutting apparatus, which are set oblique to the side of the driving-wheel frame, of the platform when the rear line of the platform is oblique to the driving-wheel frame, and its inner corner terminates near the axle of the driving-wheel, substantially as represented in Fig. 1 of the drawings, for the purpose of delivering the grain head foremost near the stubble side of the machine by a rectilinear movement of the rake. By this part of my invention the grain can be discharged with a short straight movement of the rake in an angular direction immediately between the platform and the driving-wheel frame, and thus considerable inconvenience from scattering of grain and the labor in raking a long distance experienced in the use of harvesters with long platforms—such as seen in B. F. Ray's patent—avoided.

My invention consists, second, in the arrangement of the thrust or tension-screw rod and curved brace with the dividing apparatus, grain-wheel axle, and reel-support, substantially as and for the purpose hereinafter described. By this part of my invention an unobstructed space beyond the front end of the divider to the rear end of the reel-bearer is secured, and at the same time the weight of the reel does not rest upon the finger-beam in a manner to cause its grain end to droop or sag down, nor does it come upon that portion of the frame in rear of the grain-wheel axle, but comes direct upon the axle of the machine, which is the place it should come, as a preponderance of weight on either the front or rear end of the machine is not desirable if the weight can be equally balanced and the reel firmly supported.

To enable others skilled in the art to make and use my invention, I will proceed to describe its construction and operation.

A represents the frame which supports the driving-wheel A'. It is set parallel to the path of the team.

B is the front sill of the frame A, and C the wheeled guiding-truck of the same. D is the finger-beam. The sill and finger-beam are set oblique to the frame A, and so as to gradually recede from a line running at right angles to the side wheel, as represented in the drawings, while the guards D' are set parallel to the path of the team.

$D^2$ is the reel. It is set above the oblique finger-beam, and so as to run parallel with the same.

E is the divider-shoe, and F the divider. These are arranged parallel with the path of the machine.

G is a pivoted lever arranged between the divider and the reel-bearer $a$, being pivoted by the front end at $c$ and supported at a point beyond by means of an auxiliary axle, $d$, which is attached to a projection, $d'$, of the axle $e$ of the grain-wheel H, as represented.

I is a screw-rod, attached by its lower end round the grain-wheel axle, and extended up through a bracket, $s$, which extends laterally from the rear portion of the reel-bearer. A screw-nut, $f$, retains the rod in place, and also causes it to perform the office it is designed to serve, as will be presently shown.

J is the standard that supports the reel. This standard is bowed out laterally from the grain side of the machine, as represented. This standard attaches by its lower end to the lever G and by its upper end to the reel-bearer. A slot, $g$, in its lower end allows of its being adjusted up and down when it is desired to lower or elevate the reel. The bow in the standard obviates the inconvenience experienced from such tangled or bent grain as overhangs the divider hanging round the standard, as it allows the reel a chance to force the grain far enough back to free it from the divider.

K is an auxiliary wing placed on the inner side of the divider, so as to extend a short distance forward of the inner wing, L. By using this wing in connection with the wing L the grain is directed in a proper manner in its passage to the platform.

The platform M is hinged to the rear edge of the finger-bar, so that it may be removed when the machine is to be used for mowing. On its grain edge, which recedes on an oblique line from the divider, it is guarded by a board or plate, P, which rises in nearly a perpendicular direction at its front end, and therefrom presents a twisted concave form, as illustrated in Fig. 6 of the drawings. The rear edge of the platform runs in an oblique direction from the rear end of the guard P and terminates about the center of the driving-wheel axle. From this point a curved guard, $n$, rises and extends in an oblique direction to the finger-beam. Between the guard $n$ and the driving-wheel frame the raker-stand N is situated, said stand forming a continuation of the platform and adjoining to the front side of the frame A, as represented.

O is the sickle, running parallel with the finger-beam. Its sections $m$ are longer or shorter than the distance between the guard-fingers.

From the foregoing description it will be seen that as the machine moves forward in a straight line the reel will strike the grain obliquely to the line of draft, and that the sickle will meet it in the same manner. Thus having the sickle meet the grain insures a more perfect action, for the grain is distributed over a longer edge and the different sections of the sickle have the grain presented to them in different quantities, so that when one section has just commenced its work another is partly through, and so on throughout the whole series. It will also be seen that as soon as the grain is reeled in it is partly directed by the reel-wing K, and when it is cut it is, by the combined agency of the oblique reel, auxiliary wing K, oblique finger-bar, main wing L, and spirally-twisted concave guard P, deposited upon the platform M in an angular position, and being in this position it can be discharged from the platform by a short direct movement of a hand-rake and dropped in an angular position between the rear oblique edge of the platform and the inner side of the driving-wheel frame. It will also be seen that although the reel is supported on a standard in front of the grain-wheel axle the weight of the reel does not come upon the finger-beam, but is thrown upon the driving-wheel axle through the screw-rod I, and thus the necessity of having the preponderance of weight in rear of the axle is obviated. It will further be seen that the grain side of the machine swings on an axis which is just about the same height as the axis on which the inner side swings, instead of below it, as shown in Fig. 5, although the grain-wheel revolves on an axle situated lower than the driving-wheel axle, and therefore both sides of the machine can be adjusted the same height by one adjustment; and, finally, that the axle of the wheel is thrown back as far or beyond the driving-wheel axle, and therefore the driving-wheel in turning round has no power to force it into the ground, as is the case when the grain-wheel axle is located in front of the driving-wheel axle; and, besides this, by using a wheeled truck in combination with the grain-wheel, located as I show, the machine can be turned a short corner more easily and without any danger of the grain-wheel being embedded into the ground.

What I claim as my invention, and desire to secure by Letters Patent, is—

1. The arrangement of the reel and cutting apparatus obliquely to the side of the driving-wheel frame and the platform M P $n$ when the rear line of the platform is oblique to the driving-wheel frame and its inner corner terminates near the axle of the driving-wheel, substantially as and for the purposes set forth.

2. The arrangement of the thrust or tension screw-rod I and curved brace J with the dividing apparatus, grain-wheel axle $e$, and reel-support $a$, substantially as and for the purposes set forth.

GEO. ESTERLY.

Witnesses:
 ROBT. W. FENWICK,
 A. E. BEACH.